Sept. 23, 1969  M. R. FARMER  3,468,571
CROSSARM BRACE MEANS
Filed May 31, 1968
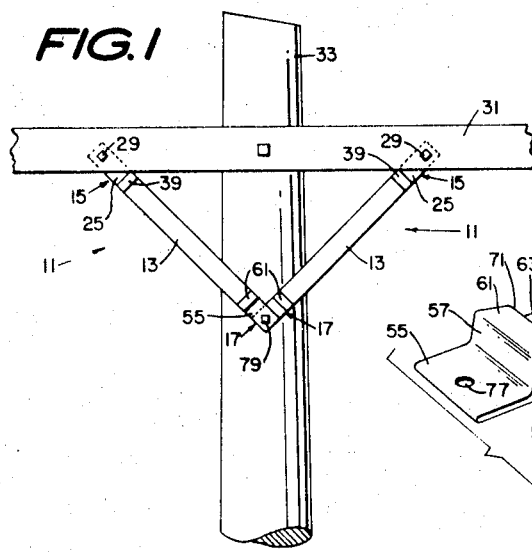
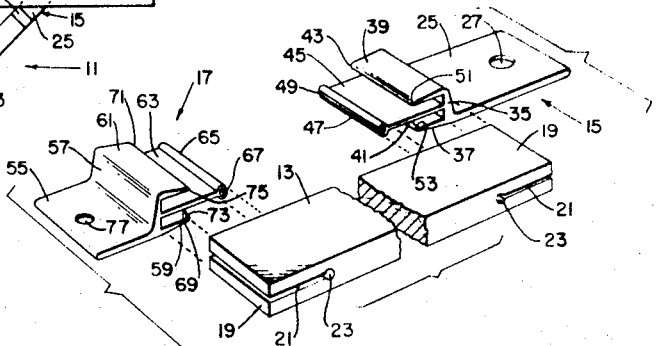
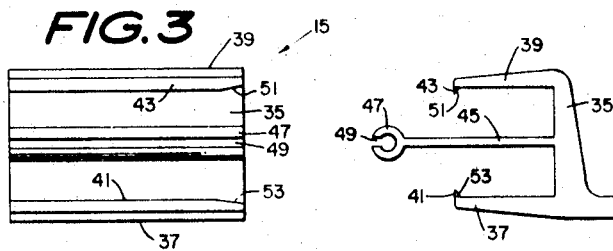
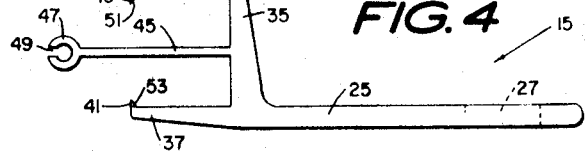
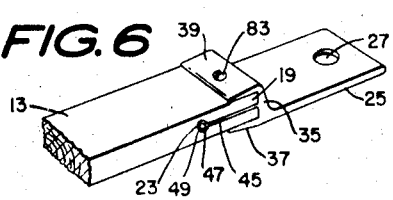
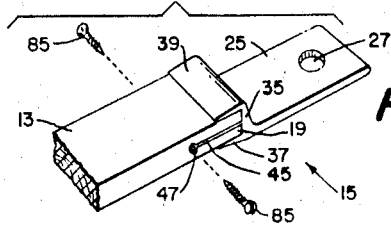
MARION R. FARMER
INVENTOR.

United States Patent Office 3,468,571
Patented Sept. 23, 1969

3,468,571
CROSSARM BRACE MEANS
Marion R. Farmer, Memphis, Tenn., assignor to Utility Products Manufacturing Company, Memphis, Tenn., a corporation of Tennessee
Filed May 31, 1968, Ser. No. 733,525
Int. Cl. F16b 9/00; B25g 3/36; E04b 1/58
U.S. Cl. 287—103                                5 Claims

ABSTRACT OF THE DISCLOSURE

An extension brace for supporting a crossarm on a utility pole, having an insulated central section and ribbed brackets attached to the opposite ends of the central section, with the brackets carrying drilled strap means for attachment to the utility pole and the crossarm.

BACKGROUND OF THE INVENTION

Field of the invention.—The present invention relates to brace means for utility pole crossarms and more particularly to extension brace means for utility pole crossarms having substantially positive locking bracket means carried by the brace for attachment of the brace to a utility pole and a utility pole crossarm affixed thereto.

The present invention further relates to methods for attaching bracketed end fixtures to an insulated brace to form brace extension means adapted for supporting crossarms on utility poles.

Description of the prior art.—There have been prior devices adapted for use in supporting crossarms upon utility poles, but these prior devices have relied upon bracket means provided with means for adapting the bracket for abutting engagement with the ends of the braces. These prior devices have additionally been provided with detachable connection means which have, after exposure to weather and vibration, become loosened, thus rendering the brace means attached thereto substantially inefficient to effectively support a crossarm in a normal manner upon a utility pole.

A search disclosed the following references: 1,815,598, Stroup, July 21, 1931; 2,283,943, Myer, May 26, 1942; and 2,906,379, Smalley, Sept. 29, 1959.

SUMMARY OF THE INVENTION

The present invention provides a brace means for crossarms mounted on a utility pole and, more particularly, to brace extension means and the method of forming same.

The present invention further provides utility pole crossarm support braces having bracketed end members affixed thereto in such manner as to withstand forces such as weather and vibration without becoming disengaged from the brace.

The present invention additionally provides brace means for utility pole crossarms having attachment means affixed thereto without conventional fastening means such as screws, bolts, pins and the like.

OBJECTS

The principal object of the present invention is to provide extension brace means for utility pole crossarms.

Another object of the present invention is to provide utility pole crossarm extension brace means having rigidly attached end brackets.

A further object of the present invention is to provide extension brace means for utility pole crossarms having end brackets bitingly engaged therewith.

Another object of the present invention is to provide rib engagement means for end brackets affixed to the ends of utility pole crossarm brace means.

A further object of the present invention is to provide a method for forming bracket means for extension brace means for attachment to a utility pole and a crossarm carried thereby.

Another object of the present invention is to provide bracket end means for a utility pole crossarm brace having rib means for locking engagement with the brace.

Another object of the present invention is to generally improve the design, construction and efficiency of utility pole crossarm brace means.

DESCRIPTION OF THE DRAWINGS

The means by which the foregoing and other objects of the present invention are accomplished and the manner of their accomplishment will be readily understood from the following specification upon reference to the accompanying drawings, in which:

FIG. 1 is a front elevational view of the preferred embodiment of the present invention attached to a utility pole and a crossarm mounted thereupon.

FIG. 2 is an enlarged fragmentary exploded view of the device of FIG. 1.

FIG. 3 is a further enlarged front elevational view of one of the end brackets of the device of FIG. 1.

FIG. 4 is a side elevational view of the device of FIG. 3.

FIG. 5 is a perspective view of the device of FIG. 3 with parts broken away for purposes of illustration.

FIG. 6 is an enlarged fragmentary perspective view of first alternate form of the device of FIG. 1; and FIG. 7 is an enlarged exploded fragmentary perspective view of a second alternate form of the device of FIG. 1.

DESCRIPTION OF THE PREFERRED EMBODIMENT

Referring now to the accompanying drawings in which the various parts are indicated by numerals, the present invention comprises brace means 11 including a substantially elongated strut 13 preferably formed of a nonconductive material such as wood or plastic, and a pair of attachment brackets 15, 17.

The strut is provided at its respective opposite ends 19 with a pair of slots 21 substantially coextensive with the width of the strut 13 extending inwardly of the ends 19 substantially along the longitudinal axis of the strut 13. The strut 13 is additionally provided with orificial means 23 spaced somewhat inwardly of the ends 19 and disposed laterally substantially equidistantly between the upper and lower faces thereof within the strut 13 communicating with the slots 21.

The bracket 15 comprises a substantially flat strap member 25 including an aperture 27 formed therein, somewhat inwardly of the outer end thereof adapted for engagement with bolt means 29 provided for attaching the bracket 15 to a crossarm 31 carried by the utility pole 33. The end of the strap member 25 remote from the apertured end thereof is rigidly connected to a seat 35 extending substantially perpendicularly away therefrom. The bracket 15 includes a flange 37 integrally attached at one of its ends to the junction of the strap 25 and the base of the seat member, 35, and a similar flange 39 attached to and extending from the tip of the seat 35 outwardly therefrom in substantially parallel spaced relation with the flange 37. The flanges 37, 39 are provided with wedge members 41, 43 rigidly attached to the distal ends thereof and substantially coextensive in length with the width of the flanges 37, 39. The bracket 15 further comprises an inflexible rib 45 attached at one of its ends to the seat member 35 and extends perpendicularly away therefrom in substantially equidistant spaced relation with flanges 37, 39. The outer edge of the rib 45 is provided with a substantially tubular member 47 attached thereto and coextensive in length with the width thereof, and includes a longitudial slot 49 formed therein. The wedges 41, 42 are provided with bevelled portions 51, 53 preferably at one of their ends to provide means for lateral slidable engagement with one of the ends 19 of the strut 13, as best illustrated in FIGS. 2 and 5 of the drawings.

The bracket 17, adapted for engagement with the end 19 of the strut 13 opposite the end thereof carrying the bracket 15, comprises a strap 55 somewhat shorter in length than the strap 25, a similar seat 57, like flanges 59, 61, a rib 63, a tubular member 65 and a slot 67 formed in the tubular member 65. The flanges 59, 61 of the bracket 17 are provided with wedges 69, 71 similar to the wedges 41, 43 carried by the flanges 37, 39, and include bevelled portions 73, 75 for guiding the bracket into desired engagement with the end 19 of the strut 13 opposite the end thereof attached to the bracket 15. The strap 55 of the bracket 17 is provided with an aperture 77 for the insertion therein of the bolt means 79, for mounting the bracket 17 upon the utility pole 33, as best illustrated in FIG. 1 of the drawings.

In the use of the device the brackets 15, 17 are affixed to the respective ends 19 of the strut 13 by alining the ribs 45, 63 with the slots 21, and the tubular members 47, 65 with the respective orifices 23 formed in the strut 13. The brackets 15, 17 are then moved laterally across the ends 19 of the strut 13 guided by the respective bevelled portions 51, 53, 73, 75 to urge the wedges 41, 43, 69, 71 into biting engagement with the outer faces of the ends 19. It will thus be readily seen that when the brackets 15, 17 are affixed to the ends of the strut 13 in such manner, the tubular portions 47, 65 carried by the brackets 15, 17 are in embracing alinement with the respective orifices 23, and the ribs 45, 63 are in snug adjacency with the respective slots 21 of the strut 13. It will be further seen that when the brackets 15, 17 are attached to the ends 19 of the strut 13 in the aforementioned manner, the wedges 41, 43, 69, 71 are in substantially rigid biting attachment with the ends 19 of the strut 13.

To further strengthen the connection of the brackets 15, 17 to the strut 13, and to enhance the rigidity of the attachment therebetween, the ends of the tubular members 47, 65 are flared pursuant the attachment of the brackets 15, 17 to the strut 13 as at the flared ends 81 thereof as best illustrated in FIG. 5 of the drawings, to contain the ends 19 of the strut 13 within the brackets 15, 17 and prevent the lateral movement of the strut 13 thereon and the disengagement of the strut 13 therefrom.

In a first alternate form of the device of the present invention as best illustrated in FIG. 6 of the drawings, the bracket 15, after attachment to the end 19 of the strut 13 in the aforedescribed manner is provided with additional strengthening means such as the screw 83 threadedly engaged with the flange 39, the end of the strut 13 and the rib 45.

In another alternate form of the present invention, as best illustrated in FIG. 7 of the drawings, the brackets 15, 17 are provided with fastening means 85 for threaded engagement with the ends of the tubular members 47, 65 to urge the ends of the tubular members 47, 65 peripherally outwardly into more firmer abutment with the circumferences of the orifices 23 to further enhance the engagement of the brackets 15, 17 with the ends 19 of the strut 13.

I claim:
1. Brace means for supporting a crossarm upon a utility pole comprising:
   (1) strut means including
      (A) slots formed in the opposite ends thereof along the longitudinal axis of said strut,
      (B) orifices disposed laterally therein,
   (2) brackets rigidly attached to the ends of said struts comprising
      (A) flange means,
      (B) means holding said flange means in spaced relation,
      (C) rib means interposed between said flange means,
      (D) means carried by said rib means engaging said orifices,
      (E) wedge means carried by said flange means engaging said strut means to complete said brace means, and
      (F) means on said brackets for affixing said brace means to a utility pole and a crossarm mounted thereupon.

2. The brace in accordance with claim 1, wherein said wedge means carried by said flange means are provided with bevelled surfaces to effect and enhance the engagement of said brackets with said strut means to form said brace means.

3. The brace in accordance with claim 1, wherein said means carried by said rib means are tubular and include flared ends, said flared ends providing rigid containment of said brackets upon said strut means.

4. The brace in accordance with claim 1, wherein a fastener is threadedly engaged with said flange means, said rib means and said strut means to effect a more rigid attachment of said bracket to said strut means.

5. The brace in accordance with claim 1, wherein fasteners threadedly engage said means to urge said means into snug abutment with said orifices within said strut means to rigidly secure said brackets against said strut means.

References Cited

UNITED STATES PATENTS

| 1,815,598 | 7/1931 | Stroup | 52—697 |
| 2,662,620 | 12/1953 | Vojta | 52—627 |
| 2,906,379 | 9/1959 | Smalley | 52—697 |

FOREIGN PATENTS

| 210,479 | 9/1957 | Australia. |
| 1,019,131 | 10/1952 | France. |
| 584,809 | 11/1958 | Italy. |
| 334,776 | 1/1959 | Switzerland. |

HENRY C. SUTHERLAND, Primary Examiner

U.S. Cl. X.R.

52—40, 697, 720